US006221265B1

(12) United States Patent
Hodén

(10) Patent No.: US 6,221,265 B1
(45) Date of Patent: Apr. 24, 2001

(54) METHOD AND DEVICE FOR CONCENTRATING LIQUID-DRENCHED MATERIAL

(75) Inventor: Ebbe Hodén, Strängnäs (SE)

(73) Assignee: Valmet Fibertech AB (SE)

( * ) Notice: Subject to any disclaimer, the term of this patent is extended or adjusted under 35 U.S.C. 154(b) by 0 days.

(21) Appl. No.: 09/582,597

(22) PCT Filed: Jan. 14, 1999

(86) PCT No.: PCT/SE99/00039

§ 371 Date: Jun. 28, 2000

§ 102(e) Date: Jun. 28, 2000

(87) PCT Pub. No.: WO99/39048

PCT Pub. Date: Aug. 5, 1999

(30) Foreign Application Priority Data

Jan. 19, 1998 (SE) ..................... 9800117

(51) Int. Cl.[7] ..................... B01D 37/00; B30B 9/24

(52) U.S. Cl. ..................... 210/770; 210/783; 210/386; 210/400; 162/56; 162/308; 162/313; 100/118; 100/120

(58) Field of Search ..................... 210/770, 780, 210/783, 386, 387, 400; 100/116, 118, 119, 120; 162/56, 308, 313

(56) References Cited

U.S. PATENT DOCUMENTS

| | | | |
|---|---|---|---|
| 4,017,398 | 4/1977 | Hartmann et al. | 210/350 |
| 5,725,783 * | 3/1998 | Hodén | 210/400 |

FOREIGN PATENT DOCUMENTS

94/12260 6/1994 (WO) .

* cited by examiner

*Primary Examiner*—Robert Popovics
(74) *Attorney, Agent, or Firm*—Lerner, David, Littenberg, Krumholz & Mentlik, LLP

(57) ABSTRACT

Methods for the concentration of a dilute material such as a fiber suspension are disclosed including enclosing the dilute material between a first straining belt and a second straining belt both moving through endless paths, and in which the width of the first straining belt is greater than the width of the second straining belt, and the method includes causing the longitudinal edges of the first straining belt to overlap the longitudinal edges of the second straining belt in an initial concentration stage, unfolding the longitudinal edges of the first straining belt and then further compressing the concentrated layer produced against the first straining belt in a further concentration stage. Apparatus for carrying out this method is also disclosed.

8 Claims, 2 Drawing Sheets

1
2
3
4
5
6
7
8
9
10
11
12
13
14
15
16
17
18
19
20
21
22
23
24
25
26
27
28
29
30
31
32

METHOD AND DEVICE FOR CONCENTRATING LIQUID-DRENCHED MATERIAL

FIELD OF THE INVENTION

The present invention relates to a method for concentrating liquid-drenched material, particularly for de-watering fiber suspensions, in which the material is formed into a string embraced by a straining cloth and rolled while covered with that cloth. The present invention also relates to apparatus suitable for carrying out this method.

BACKGROUND OF THE INVENTION

A method and an apparatus for concentrating liquid-drenched material by rolling a string of that material while the string is embraced by an endless straining cloth belt are known, for instance, from U.S. Pat. No. 4,017,398. Apparatus of this type which are known are encumbered with certain drawbacks. For instance, a single straining cloth belt which embraces a material string has the tendency to rupture at the edge regions of the string when rolling at high pressure, and generally has a width which is more than twice the breadth of the rolled material string, resulting in large space requirements.

An object of the present invention is to provide a novel method and novel apparatus with which the aforesaid drawbacks are avoided at least to a substantial extent.

SUMMARY OF THE INVENTION

In accordance with the present invention, this and other objects have now been realized by the invention of a method for the concentration of a dilute material by forming the dilute material into a concentrated layer having a predetermined width, the method comprising enclosing the dilute material between a first straining belt having a first width which is insufficient to completely enclose the concentrated layer and including a pair of longitudinal edges and a center portion, and a second straining belt having a second width which is insufficient to completely enclose the concentrated layer, and including a pair of longitudinal edges, moving the first and second straining belts through first and second endless paths, the first width being greater than the second width, causing the pair of longitudinal edges of the first straining belt to overlap the pair of longitudinal edges of the second straining belt in an initial concentration stage, unfolding the pair of longitudinal edges of the first straining belt, and further compressing the concentrated layer against the first straining belt in a further concentration stage. In a preferred embodiment, the dilute material comprises a fiber suspension.

In accordance with one embodiment of the method of the present invention, the further compressing of the concentrated layer comprises compressing the concentrated layer between the first straining belt and a third straining belt having a third width and moving in a third endless path, the third width being greater than the second width.

In accordance with another embodiment of the method of the present invention, causing of the pair of longitudinal edges of the first straining belt to overlap the pair of longitudinal edges of the second straining belt comprises folding the central portion of the first straining belt over a first transverse folding edge having a first end and a second end, and folding each of the pair of longitudinal edges of the first straining belt over a second folding edge extending obliquely forward and outward in the direction of movement of the first straining belt and over a third folding edge extending obliquely forward and inward in the direction of movement of the first straining belt, whereby the pair of longitudinal edges of the first straining belt are folded over the first and third folding edges first inwardly over the central portion of the first straining belt and then parallel to the center portion of the first straining belt.

In accordance with another embodiment of the method of the present invention, unfolding of the pair of longitudinal edges of the first straining belt comprises folding the pair of longitudinal edges of the first straining belt outward and rearward around a third folding edge and a second folding edge and folding the central portion of the first straining belt back over a first folding edge.

In accordance with the present invention, apparatus has also been devised for the concentration of dilute material by forming the dilute material into a concentrated layer having a predetermined width, the apparatus comprising a first straining belt having a first width which is insufficient to completely enclose the concentrated layer, and a pair of longitudinal edges and a central portion, and having a first endless path, a second straining belt having a second width which is insufficient to completely enclose the concentrated layer, and a pair of longitudinally extending edges, and having a second endless path, the first width being greater than the second width, enclosing means for causing the longitudinal edges of the first straining belt to be folded over the longitudinal edges of the second straining belt whereby the first and second straining belts enclose the concentrated layer in an initial concentration stage, and secondary concentration means comprising means for unfolding the longitudinal edges of the first straining belt whereby the concentrated layer is further compressed against the first straining belt in a further concentration stage. Preferably, the dilute material comprises a fiber suspension.

In accordance with one embodiment of the apparatus of the present invention, the apparatus includes a third straining belt having a third width and a third endless path, the third width being greater than the second width, and the third straining belt disposed for compressing the concentrated layer between the first straining belt and the third straining belt in the further concentration stage.

In accordance with the present invention a method has been devised in which at least a terminating part of the concentration process effected by rolling is carried out with the string of material located between outwardly spread, single sheets of straining cloth, and wherein

- for the purpose of enclosing the string of material there is used two belts of straining cloth, each travelling in a respective endless path, and each having a width which alone is insufficient to fully enclose the string of material;
- the string is enclosed by a narrow belt and a broader belt of straining cloth, and the longitudinally extending edge portions of the broader web are caused to overlap the longitudinally extending edge portions of the narrower belt; and wherein
- at least the broader web is spread out to form a single straining cloth sheet subsequent to the initial stage of the concentration process, and is also used during the remainder of said concentration process.

The present inventive method places no great strain on the straining cloth belts, and enables the material to be concentrated at high roll pressures, since the terminating concentration process is carried out with the string of material located between outwardly spread, single sheets of cloth. Only a relatively small amount of space is required, since the broader belt can have a width which is substantially smaller than the circumference of the rolled string.

According to the present invention, apparatus suitable for carrying out the aforesaid method while achieving the advantages afforded thereby includes a first stage through which the material is transported in enclosure means during initial concentration of the material to form a string of material and which is comprised of two separately advanced endless belts of straining cloth, and a second stage in which the material is finally concentrated by rolling the string of material as it is transported between two outwardly spread belts of straining material that move in two endless paths, wherein the enclosure means is formed by a narrower and a broader belt of straining cloth, each having a width which alone is insufficient to form said enclosure means, and wherein at least the broader belt also extends through the second stage and, in an outwardly spread state, also forms one of the transport belts used in this stage of the process.

BRIEF DESCRIPTION OF THE DRAWINGS

The present invention will now be described in more detail with reference to the following detailed description which, in turn, refers to the accompanying drawings, in which.

DETAILED DESCRIPTION

Figure 1:
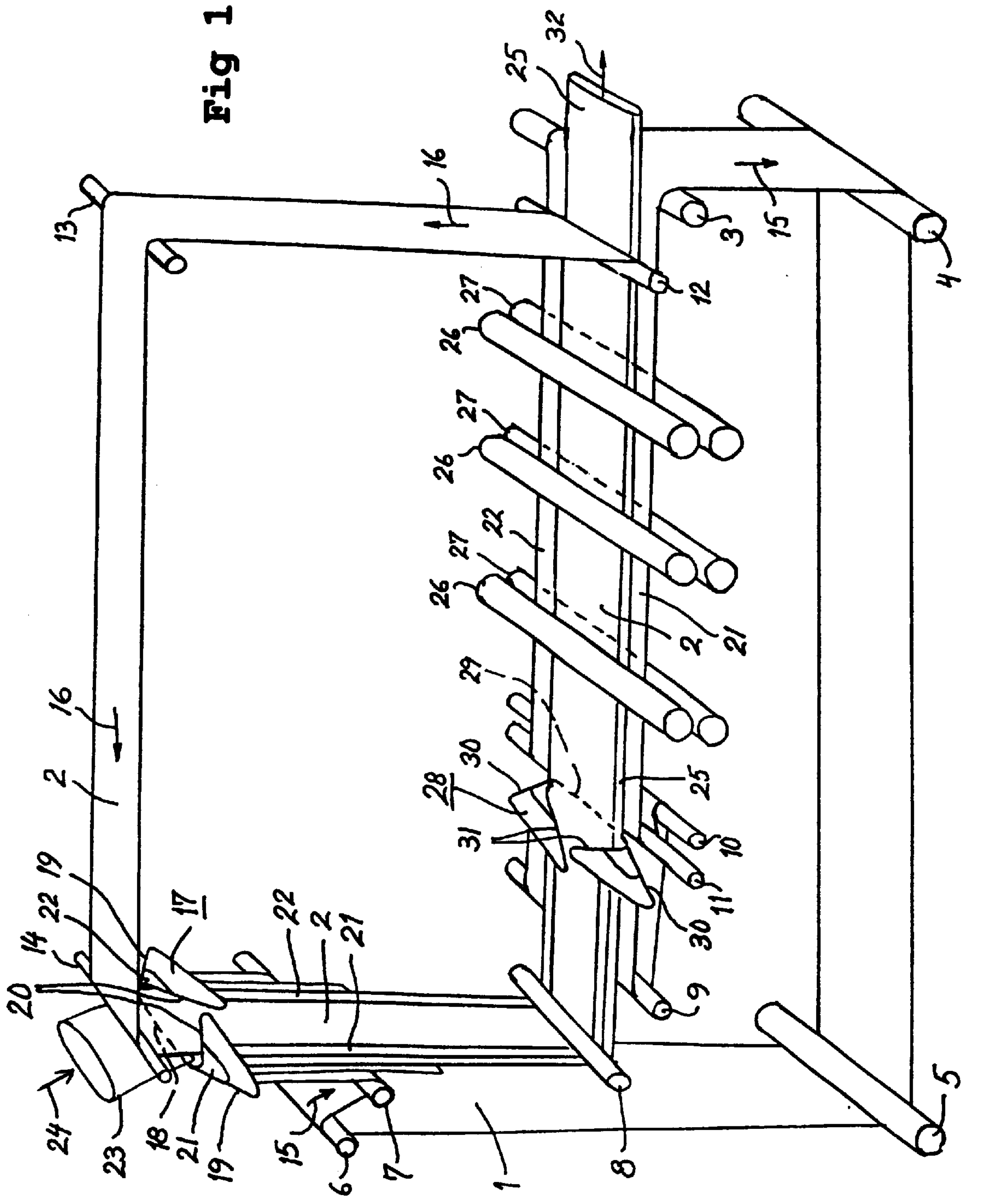
FIG. 1 is a side, elevational, schematic representation of a first embodiment of the apparatus of the present invention.

Those components that find agreement or general agreement in both Figures have been identified with the same reference numerals.

The apparatus for concentrating liquid-drenched material, such as fiber suspensions, and particularly paper pulp suspensions, shown in FIG. 1 includes two belts of straining cloth, 1 and 2, which are each advanced in a respective endless path and which may comprise a plastic wire cloth. One belt 1 is guided around guide rollers 3–11 and is broader than the second belt 2, which is guided around guide rollers, 12, 13 and 14, and also around the guide roller 8 used to guide the broader belt 1. The directions in which the belts, 1 and 2, move are indicated by respective arrows, 15 and 16.

Positioned beneath the guide roller 14 is a known folding device generally referenced 17 (see for instance International Application No. WO 94/12260) that includes a first folding edge 18 which extends transversely to the direction of movement of the belts, 1 and 2, and over which the central part of the belt 1 is folded. Connected to respective ends of the first folding edge 18 are second and third folding edges, 19 and 20, which, as seen in the direction of movement of the folded belt 1, extend obliquely forwards and outwards and obliquely forwards and inwards respectively. The longitudinally extending edge parts, 21 and 22, of the folded belt 1 are folded over the second folding edges 19 firstly in towards and over the central part of the belt 1 and are then again folded over the folding edges 20, so that said edges will partially cover and extend parallel with the central part. As the edge parts, 21 and 22, of the belt 1 are folded, the belt 2, whose width corresponds generally to the length of the folding edge 18, is introduced into the folding device 17 in a manner such that the sides of the belt 2 will be overlapped by the edge parts, 21 and 22, of the belt 1 such as to form from the two belts, 1 and 2, an enclosure for a slurry of material to be concentrated, which is delivered through a hopper 23 in the direction of arrow 24. In order to hold the belts 1 and 2 together in a position in which they embrace this material, the belts may be caused to run in a perforated tube (not shown) mounted between the folding device 17 and the guide roller 8, so as to form a string 25 of partially concentrated material, which is then further concentrated by rolling the material between pressure rolls, 26 and 27.

Before finally concentrating the material between the rolls, 26 and 27, the edge parts, 21 and 22, of the belt 1 are spread out in a belt unfolding device generally referenced 28, including a first folding edge 29 which extends transversely to the direction of movement of the belt 1. Connected to each end of the first folding edge 29 are respective second and third folding edges, 30 and 31, which, seen in the direction of belt movement, extend obliquely rearwards and outwards and obliquely rearwards and inwards, respectively. The longitudinally extending edge portions of the belt 1 are therewith unfolded outwards around the third folding edge 31 and then rearwards around the second folding edges 30, while the central portion of the belt 1 is folded back over the first folding edge 29.

The concentrating apparatus shown in FIG. 1 thus includes a first stage located between the folding device 17 and the unfolding device 28, in which the material delivered at locations 23 and 24 is concentrated into a coherent string 25 by straining the material through the enclosure formed by belts, 1 and 2, and a second stage located between the unfolding device 28 and the roller 12 in which the material is finally concentrated by rolling the string 25 situated between the belt 2 and the belt 1 outwardly spread in the unfolding device 28, the finally concentrated material departing in the direction of arrow 32. Rolls that operate at moderate pressure or pressures may also be provided in the region between the guide roller 8 and the unfolding device 28. However, in the case of high pressure rolling of the material, the string of material 25 shall be located between outwardly spread, single sheets of straining cloth. The devices required for collecting and conducting away liquid that drains from the material or is pressed therefrom have not been shown in the drawings, for the sake of clarity.

Although not shown in-detail, the belts, 1 and 2, may be driven by driving one or more of the guide rollers 3–14 around which these belts pass. It will be seen from the illustrated arrangement of rolls 9–11 that the belt 1 unfolded in the device 28 forms a support for the string 25 immediately as that string exits from the unfolding device. The use of devices 17 and 28 of the kind shown in FIG. 1 is favorable from both the aspect of space and from the aspect of stress, or strain, in comparison to successively shaping belts from a flat to a tubular section in accordance with U.S. Pat. No. 4,017,398, for instance. It will be understood, however, that the invention is not restricted to the use of devices of the kind illustrated in FIG. 1.

As noted above, in the case of the arrangement shown in FIG. 1 the width of the belt 2 corresponds to the lengths of the folding edges, 18 and 29, so that overall it has the shape of an outwardly spread single sheet. In certain cases, it is desirable that the upper side of the string 25 has a straining belt 33 whose width exceeds the width of the string 25 as the string passes between the roll pairs, 26 and 27, as shown in the FIG. 2 embodiment, so as to avoid any direct contact between the string material and the upper rolls 26.

Figure 2:
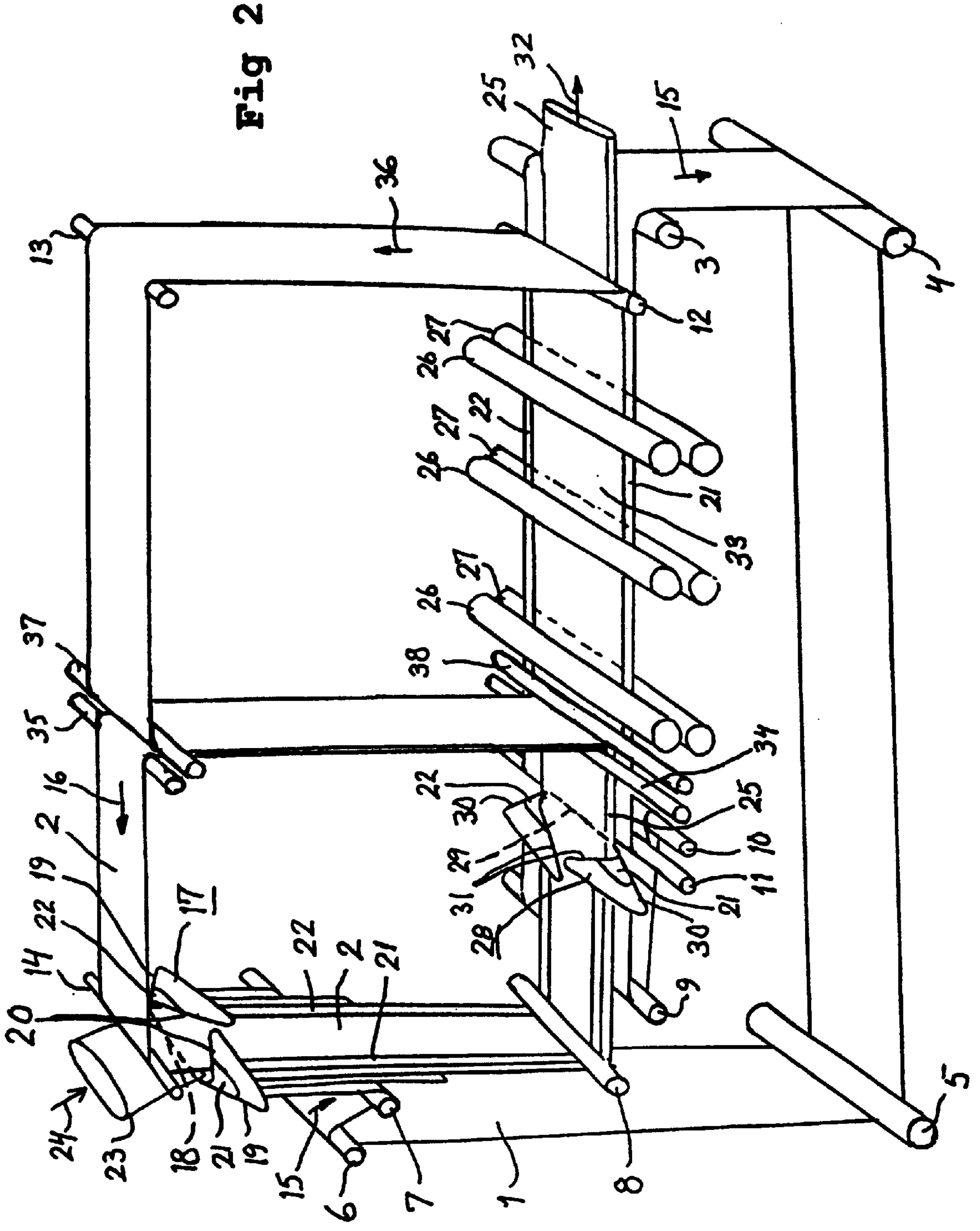
FIG. 2 is a side, elevational schematic representation of a second embodiment of the apparatus of the present invention.

Thus, according to FIG. 2, the belt 2 forming part of the enclosure formed in the folding device 17 also passes around and upwards from a guide roller 34 located immediately downstream of the unfolding device 28, in addition to passing around the guide rollers, 14 and 18, and, by means of a guide roller 35 located above the guide roller 34, back towards and around the guide roller 14. The part of the apparatus in which the material is finally concentrated downstream of the unfolding device 28 uses a further straining belt 33 which, as mentioned above, is broader than the belt 2 and the string 25, but which is preferably narrower than the belt 1. The belt 33 extends in an endless path in the direction of arrow 36, around guide rollers, 12 and 13, and around two guide rollers, 37 and 38, located adjacent respective guide rollers, 35 and 34.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for the concentration of a dilute material by forming said dilute material into a concentrated layer having a predetermined width, said method comprising enclosing said dilute material between a first straining belt having a first width which is insufficient to completely enclose said concentrated layer and including a pair of longitudinal edges and a center portion, and a second straining belt having a second width which is insufficient to completely enclose said concentrated layer, and including a pair of longitudinal edges, moving said first and second straining belts through first and second endless paths, said first width being greater than said second width, causing said pair of longitudinal edges of said first straining belt to overlap said pair of longitudinal edges of said second straining belt in an initial concentration stage, unfolding said pair of longitudinal edges of said first straining belt, and further compressing said concentrated layer against said first straining belt in a further concentration stage.

2. The method of claim 1 wherein said dilute material comprises a fiber suspension.

3. The method of claim 1 wherein said further compressing of said concentrated layer comprises compressing said concentrated layer between said first straining belt and a third straining belt having a third width and moving in a third endless path, said third width being greater than said second width.

4. The method of claim 1 wherein said causing of said pair of longitudinal edges of said first straining belt to overlap said pair of longitudinal edges of said second straining belt comprises folding said central portion of said first straining belt over a first transverse folding edge having a first end and a second end, and folding each of said pair of longitudinal edges of said first straining belt over a second folding edge extending obliquely forward and outward in the direction of movement of said first straining belt and over a third folding edge extending obliquely forward and inward in said direction of movement of said first straining belt, whereby said pair of longitudinal edges of said first straining belt are folded over said first and third folding edges first inwardly over said central portion of said first straining belt and then parallel to said center portion of said first straining belt.

5. The method of claim 1 wherein said unfolding of said pair of longitudinal edges of said first straining belt comprises folding said pair of longitudinal edges of said first straining belt outward and rearward around a third folding edge and a second folding edge and folding said central portion of said first straining belt back over a first folding edge.

6. Apparatus for the concentration of dilute material by forming said dilute material into a concentrated layer having a predetermined width, said apparatus comprising a first straining belt having a first width which is insufficient to completely enclose said concentrated layer, and a pair of longitudinal edges and a central portion, and having a first endless path, a second straining belt having a second width which is insufficient to completely enclose said concentrated layer, and a pair of longitudinally extending edges, and having a second endless path, said first width being greater than said second width, enclosing means for causing said longitudinal edges of said first straining belt to be folded over said longitudinal edges of said second straining belt whereby said first and second straining belts enclose said concentrated layer in an initial concentration stage, and secondary concentration means comprising means for unfolding said longitudinal edges of said first straining belt whereby said concentrated layer is further compressed against said first straining belt in a further concentration stage.

7. The apparatus of claim 6 wherein said dilute material comprises a fiber suspension.

8. The apparatus of claim 6 including a third straining belt having a third width and a third endless path, said third width being greater than said second width, and said third straining belt disposed for compressing said concentrated layer between said first straining belt and said third straining belt in said further concentration stage.

* * * * *